United States Patent Office 3,084,608
Patented Apr. 9, 1963

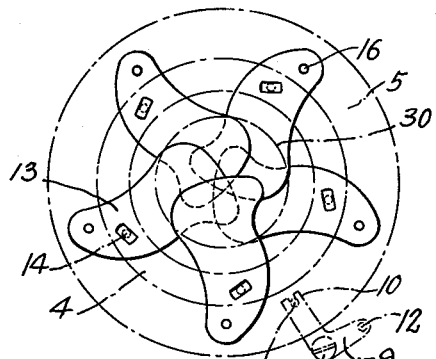
FIG.6.
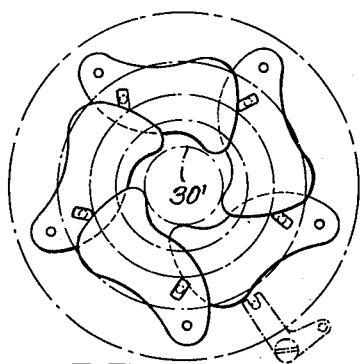
FIG.7.
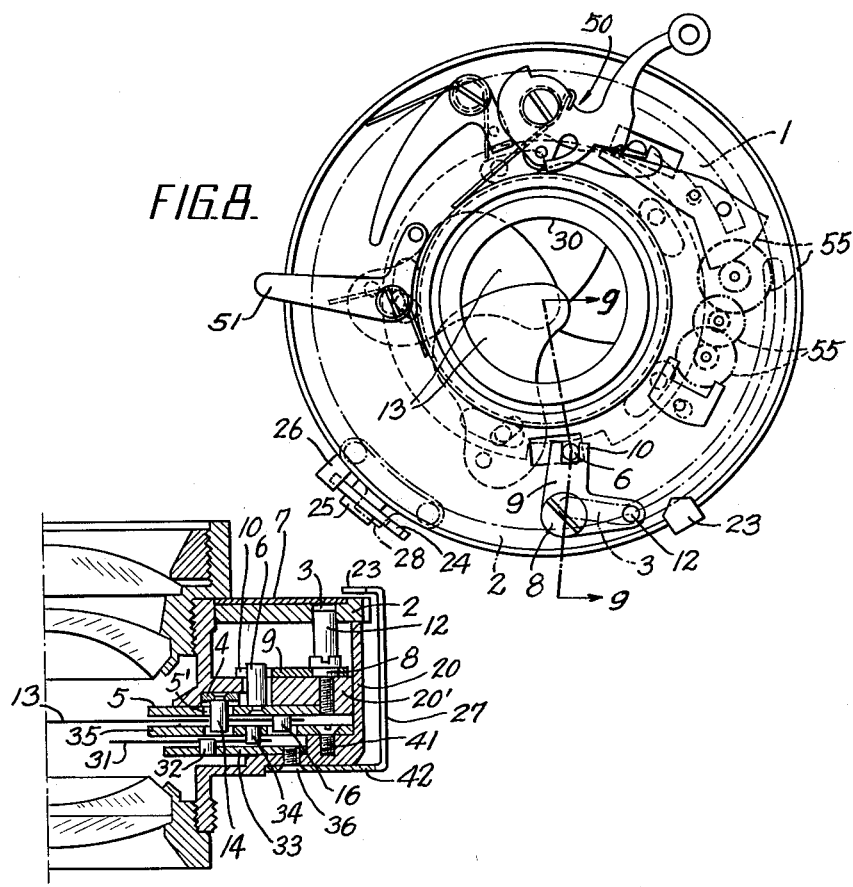
FIG.8.
FIG.9.

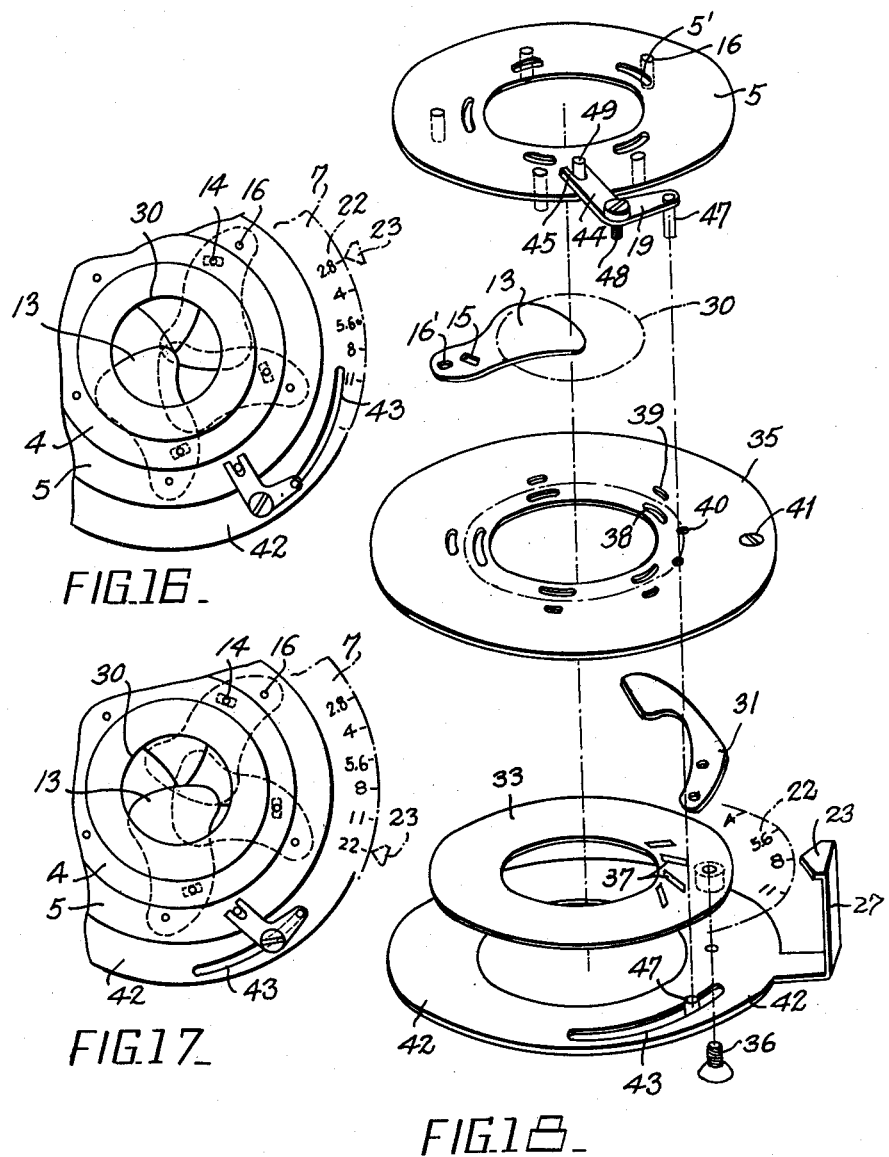

3,084,608
LENS SHUTTER FOR CAMERA
Tatsuo Kobayashi, Amagasaki City, Japan, assignor to Chiyoda Kogaku Seiko Kabushiki Kaisha, Osaka City, Japan, a corporation of Japan
Filed July 23, 1958, Ser. No. 750,428
Claims priority, application Japan July 24, 1957
7 Claims. (Cl. 95—64)

The present invention relates to a lens shutter for a camera, and more particularly a blade-reciprocating type shutter which is capable of operating at high speed.

Heretofore, high speed camera shutters have been known, which include lens shutters of the so-called shutter blade reversing type, and in which an appropriate number of shutter blades are arranged in such manner that an extraordinarily wide range of exposure time may freely be controlled. As is well-known, generally, the principal driving means for such shutters engages with gear wheel controlling means which comprise a balance wheel and a relief stop. In such shutters a full stop mechanism or a balance wheel mechanism may be employed; or the inertia of a small member may be utilized. Other methods of stopping and reversing the opening movement may also be used. In any of such methods, the motion of the principal driving means has been prolonged appropriately, in order to attain a desired time of exposure. In such cases, especially with smaller intervals of exposure time, only limited engagement is necessary between the driving means and the stopping device, which requires an extremely accurate alignment for a shutter assembly. Therefore, known camera shutters of this type have been disadvantageous with respect to manufacturing tolerances. Moreover, other methods for regulating shutter time include the well known method, wherein the movement of the driving pins of the shutter blades is altered corresponding to the movement of the main driving means, and in the case of high shutter velocity, the total operational angle of the exposure blades is decreased in order to reduce the amount of energy required by actuation of the exposure blades, making possible an extraordinarily short shutter time. In this method, in the case of high shutter velocity, the maximum aperture of the shutter blades necessarily becomes smaller. Moreover, as it is usual for the driving means to have mass or inertia comparable to the inertia of the shutter blades, there would be the disadvantage that any satisfactorily high velocity exposure could be achieved no matter how the operational angle or shutter blades may be decreased.

In the above well-known shutter of reciprocating blade type, the higher shutter velocity is approximately $1/500$ sec. Usually a higher shutter velocity can not be effected. Consequently, the efficiency becomes as low as approximately 60%. This is not deniable.

In contrast with the above, the present invention is contemplated to eliminate the disadvantages referred to above. Based on an entirely different principle from those of the usually well-known governing devices for shutter time and accompanying iris-limiting device or exposure mechanism, the present invention provides a photographic shutter having a novel shutter time controlling device of a super-high velocity of $1/2000$ sec. and an accompanying spur-high velocity iris-aperture limiting device or high fidelity exposure mechanism. The present invention, for the first time makes it possible for the exposure time not only to be controlled in high velocity exposure without using an ordinary shutter, but also for a super-high velocity of $1/2000$ sec. to be obtained without a governor. Particularly, the invention can be performed by means of a simple construction to govern super-high velocity shutter time, and also $1/1000$ sec. or $1/2000$ sec. shutter time, in addition to the usual shutter time governing range, e.g. 1 to $1/500$ sec. (standard exposure time), Furthermore, by using mechanism according to the invention it is possible to obtain the stated results without substantial improvement in the ordinary shutter bladed mechanism or the shutter time governor. Moreover, there is the advantage that occurrence of the inaccurate shutter time due to the variation of the operation of lens shutter can be avoided perfectly, and the appropriate shutter time can always be achieved easily and with high fidelity as per speed numerals.

According to the invention, the maximum diameter of the lens opening provided by the shutter blades is changed by altering the overlapping condition of the blades. Thus, to obtain super-high shutter speed the diameter of the opening must be small.

In the following descriptions, the further features, objects and advantages will be explained in detail with reference to the accompanying drawings, of which:

FIGS. 2 to 7 represent respective states of aperture of shutter blades;

FIG. 8 is a plan view illustrating the principal construction of the shutter time controlling means according to this invention;

FIG. 9 is a longitudinal sectional side view along VI—VI line of FIG. 5;

FIGS. 16 and 17 are plan views showing the essential parts of the high fidelity shutter mechanism according to this invention, with a part thereof being broken away;

FIG. 18 is a development illustration of FIGS. 16 and 17;

Figure 1:
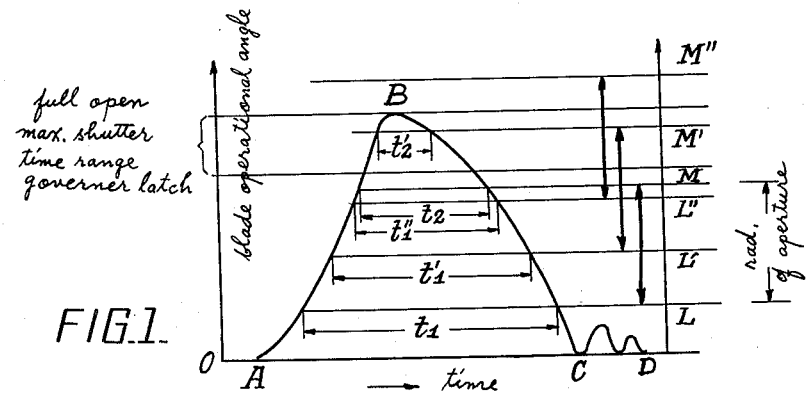
FIG. 1 is a characteristic curve diagram showing the relationship between the opening and closing operation of well-known shutter blades and time.

Referring to FIG. 1 which is an operational curve for well-known shutter blades, i.e. a general graph representing the relationship between the blades, shutter apertures and the shutter time. Shutter blades begin to move from A with the movement of a driving pin, the apertures being then increased at a gradually increasing rate, until the widest position B of the aperture curve is arrived, where the rate of increase is zero, then the closing motion being commenced, thereupon, the closing position C is arrived at and finally stops at D after several fluctuations. In the ordinary shutters, the relative position of the iris-aperture with respect to the operational angle of the shutter blades must be fixed when the shutter is being opened. This is so even when a governor controls the longest exposure. The outer periphery M of the lens opening must be set with some margin so as not to allow the shutter blades to remain there when the shutter is being opened. The middle position L must be set with some margin so as to prevent further advance of exposure due to rebound as seen at C and D in the curve.

In this case, the margin referred to corresponds to a range above M and below L. In fact, even after the opening movement begins, the overlapping of blades remains to some extent, until the L-line is reached, that is to say a preliminary movement before the aperture is opened. Therefore, the opening has not yet been set out, but it is meant by the going across L-line that the blades begin to open from one another. Above M, the motion towards the full opening is continued. In this instance, the effective time of exposure T is given as below:

$$T = \frac{t_1 + t_2}{2}$$

See FIG. 1. In the case of a high speed exposure, as the shutter blades are not permitted to remain in the opening, the overlapping of the shutter blades may be increased to shift L-line, i.e. the actual beginning of opening, up to L', consequently also M-line moves to M' to obtain high velocity, in order to increase the time spent by the preparatory movement from the start of shutter blades to the commencement of opening.

In the usual lens-shutter, such an operation has been impossible. According to the present invention, however, the operational condition of shutter blades themselves will show substantially no variations, whereas the relative position of aperture will change to new positions, the middle L' and outer periphery M', if the relative position of the revolving shaft of exposure blades with the actuating pin is changed, the effective shutter time T' being as follows:

$$T' = \frac{t'_1 + t'_2}{2}$$

Figure 2:
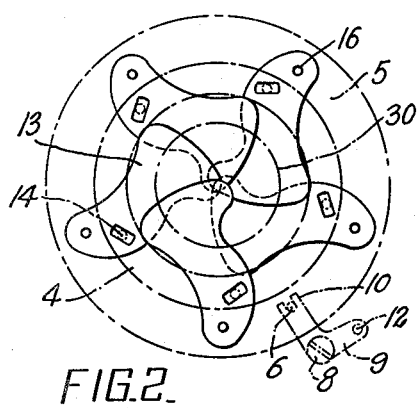
Figure 3:
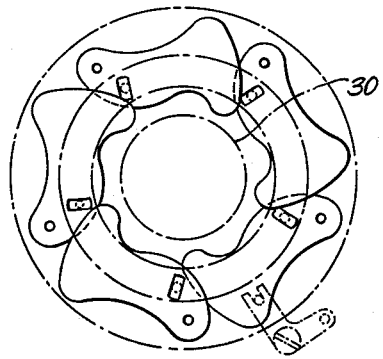
Figure 4:
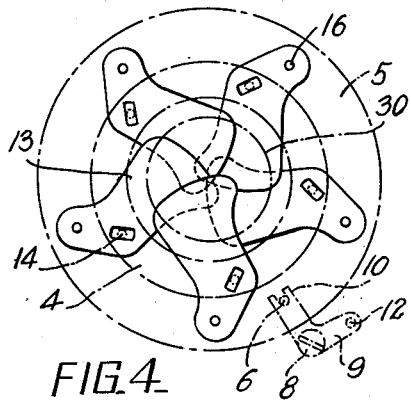
Figure 5:
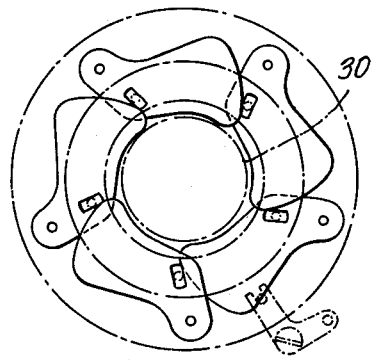

It is evident that $T' < T$, denoting a short exposure time. In other words, a high velocity is obtainable. FIGS. 4 and 5 correspond to the latter case of closing and opening of blades respectively, FIGS. 2 and 3 represent the standard conditions. Further, when the relative positions of the revolving shaft of revolving blades with respect to the actuating pin is changed, the relative positions of apertures will be L", M", the effective time of shutter T" for this instance being as follows:

$$T'' = \frac{t''_1 + t''_2}{2} (_2''t = 0)$$

It is apparent from the above, that even a shorter exposure time is possible. FIGS. 6 and 7 represent such a condition. Now if a high shutter velocity for the ordinary shutter is assumed as the standard high shutter velocity, that of the present invention may be called a super-high velocity exposure.

Figure 10:
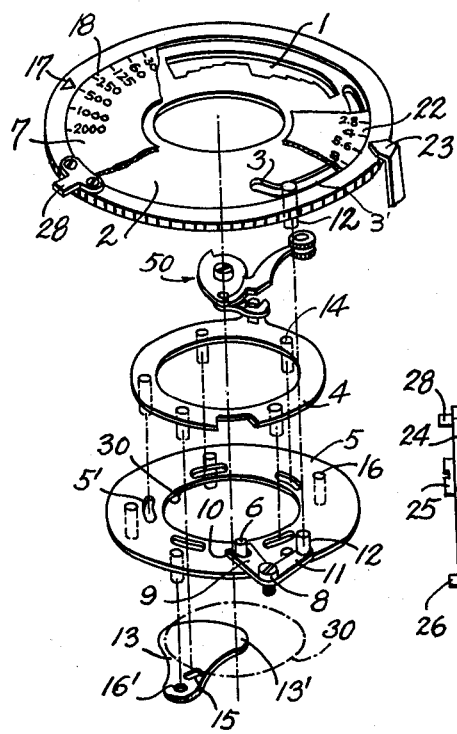
FIG. 10 is a developmental illustration of operational essential parts of the apparatus shown in FIGS. 5 to 6.

In FIGS. 2 to 10, the operation and construction of the exposure time control apparatus according to this invention are shown. Similar parts are referred to by similar symbols. Each of FIGS. 2 to 7 represents the state of aperture of the shutter blades of this invention at each second. FIGS. 8 and 9 represent the constructions and arrangements, by respective type of drawing methods, which are designed to retain the opening versus closing conditions. FIG. 10 is a development of the aforementioned constructions and arrangements.

Referring to FIGS. 8, 9 and 10, a governor 55 (see FIG. 8) of a well-known gearing and associated standard control cam 1 for exposure time are arranged in a shutter time controlling ring 2 with a super-high velocity shutter time controlling cam 3 formed in a portion thereof, said control ring 2 being fitted with a pointer on a part thereof, which points to a velocity scale 18 arranged on a surface plate 7. See FIG. 10. It follows that by allowing the pointer 17 to register with each respective scale marking of the standard exposure time range according to the usually well-known method of the velocity scale 18, i.e. from one second i.e., the longest exposure time, to 1/500 second i.e., the standard highest shutter velocity, the engaging position of cam 1 with governor 55 is altered, thereby varying the momentum of said governor 55 and imparting respective variations thereto. Now, a range from 1 to 1/500 second being cited by way of example, such numerals vary of course to some extent depending upon the shutter used. The shutter blades 13 are pivoted on revolving ring 5 for the shutter blades by means of revolving shafts 16 for the iris blades. Furthermore, a slot 15 in each shutter blade 13 for the actuation of the shutter blade engages with an actuating pin 14 which in turn is fixed in actuating ring 4, and extends through a slot 5' of the revolving ring 5, whereby said well-known actuating ring 4 is separate from the revolving ring 5 referred to above. Further, said revolving ring 5 is provided with a pin 6 fixed thereto. Between said pin 6 and the control cam 3 of control ring 2 is provided, a lever 9 a part of which is pivoted as a transmission on an axis 8 at a suitable position within inner casing 20'. See FIG. 9. A bifurcated end 10 of said lever 9 engages with the said pin 6, and a transmission rod 12 fixed in the other end 11 extends through the control cam 3. See FIGS. 9 and 10.

Referring again to FIGS. 8 to 10, the controlling cam 1 as well as controlling cam 3 are arranged in one controlling ring 2. It can also be effected easily to provide the two cams in separate members respectively for convenience sake in the design, and if necessary, said two may be connected readily together.

FIG. 10 represents an instance where the index mark 17 is in register with the highest standard shutter velocity, 1/500 second of the scale 18. The standard velocity from 1 to 1/500 second may be effected by stepwise alteration of the engaging position for controlling cam 1, as in the usual shutter. In order to obtain a super-high shutter velocity, such as 1/1000 sec., and further 1/2000 sec., the controlling ring 2 is rotated anticlockwise for registering the pointer 17 with the corresponding scale, whereby as interlocking pin 12 is shifted from the standard velocity position 3' FIG. 10 to the position of regulating cam 3, it deflects inwards and the lever 9 revolves anticlockwise around the spindle 8 as a fulcrum. Therefore, the pin 6 engaging with the bifurcated end 10 of lever 9 revolves the ring 5 in a clockwise direction. Thus, the positions of the revolving shafts 16 vary and the shutter blades 13 are rotated about the driving pin 14 in a clockwise direction. As seen in FIG. 4 or FIG. 6, the portions of shutter blades 13 closing the opening 30 of the shutter are relatively larger as compared with the corresponding parts of the shutter blades at the standard exposure as shown by FIG. 2. FIGS. 4 and 5 represent an instance, where the velocity pointer 17 is adjusted at a velocity of 1/1000 second on the velocity scale 18. In this condition, said shutter blades will be moved by the driving pins 14 about the revolving shaft 16, when the opening or closing movement is performed by means of the main driving means 50 and release 51 as shown in FIG. 8 in a well-known manner. The total or overall operational angle then will not vary substantially as compared with the corresponding standard shutter velocity. However, since the effective operational angle for an actual exposure decreases correspondingly with increase in the overlapping of rear portions 13' of shutter blades 13, a correspondingly shorter shutter time can be obtained. For this reason, the standard highest shutter velocity has been merely 1/500 second at most in a usual well-known type shutter, while a series of super-high velocity shutter times, such as 1/700 sec., 1/1000 sec., 1/2000 sec. is obtainable in a shutter according to this invention.

The above-mentioned type of shutter is that wherein a driving pin 14 is inserted in a slot 15 of shutter blades 13 and a revolving shaft 16 is inserted in an axial hole 16' (FIG. 10.) The present invention, however, can well be applied in a type of shutter wherein the actuating pin 14 is inserted in the axial hole 16', or other shutter blades wherein the relative position between the slot 15 and the axial hole 16' is reverse to those shown in shutter blades 13 of FIGS. 2 to 6 or FIG. 10.

The function of usual shutters has been improved according to the present invention, in that the exposure velocities for the lens shutter covering low, medium, high velocities and super-high velocities, particularly super-high velocities of 1/1000 sec. and 1/2000 sec. have become accurate and easy.

Figure 11:
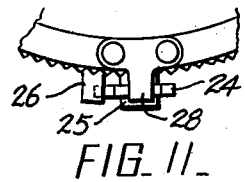
FIGS. 11, 12 and 13 are schematic illustrations, in broken plan, side and front elevations, representing the iris aperture limiting means for super-high shutter velocity according to this invention.
Figures 12, 13:
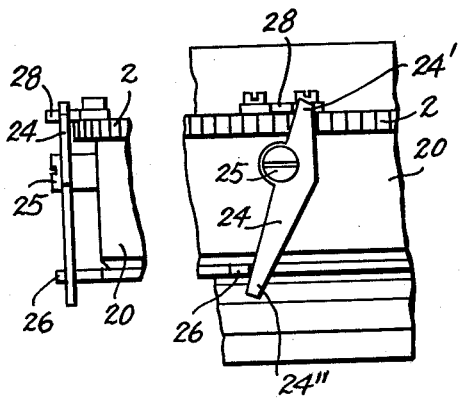

FIGS. 11, 12 and 13 illustrate schematically an iris-aperture limiting means as required correspondingly by the super-high velocity shutter time as determined by the shutter time controlling means shown in FIGS. 8 to 10 as described before.

The actuation manner for obtaining the super-high velocity shutter time in the above-mentioned apparatus is to ensure all high velocity exposure time easily by altering the relative position between the actuating pin 14 of each shutter blade 13 and the revolving shaft 16, so as to increase the overlapping of the rear portions 13' of shutter blades in accordance with the super-high shutter velocity is reached. In the case of said super-high shutter velocity, since the maximum aperture of shutter blades will become smaller as compared with the case of the standard exposure actuation, it is needed to provide an iris-aperture limiting device, which serves to regulate the aperture interlockingly in accordance with the desired super-high velocity so as not to open wider than the maximum aperture of shutter blades. The reason for this is as follows: In the case of the super-high velocity exposure, the effective aperture bore is only a part corresponding to the aperture of shutter blades. Therefore, such an apparatus is necessary for avoidance of errors in the practical photographing operation. Referring to the drawings, this will now be explained. As apparent from FIG. 4 or FIG. 6 the increase in the overlapping of the rear portion 13' of shutter blades means that the blades have preparatively been advanced in the direction reverse to the aperture provided by the shutter blades. As the total operational angle of shutter blades 13 is constant, a deviation of position will occur, by advancing the angle reversely, even when fully opened. In the case of a super-high shutter velocity, i.e. as in FIG. 5 and FIG. 7, the relative position of the aperture 30 of shutter blades 13 with respect to the standard aperture shown in FIG. 3 will become changed. In FIG. 7, a part of rear portion 13' of shutter blades remains in aperture 30. Therefore, an iris value exists between its internal contact circle 30' and circle of aperture 30, that can be determined in area.

In reference to the foregoing description, a further explanation will further be given with respect to the shutter limiting apparatus shown in FIG. 8, FIG. 9 and FIGS. 11, 12 and 13 as follows. A shutter time controlling ring 2 with a cam 3 for regulating shutter time of super-high velocity above 1/500 second is equipped with an engaging protrusion 28 for connection with an iris-guiding ring 42 on a part thereof and simultaneously iris blades 31 having a blade actuating pin 32 as well as an iris-stopping pin 34 extending through corresponding holes therein is revolvingly held between the iris-stopping ring 35 and blade actuating ring 33, said blade actuating ring being fitted with a guide ring 42 having index mark 23 by means of a set screw 36. In such a well-known lens-shutter device as referred to above as a connecting means for the governing ring 2 and guide ring 42, said guide ring being provided with a guide protrusion 26 on a part thereof, whereon the engaging protrusion 28 and the above-mentioned guide protrusion 26 of ring 42 are engaged respectively with the head portion 24' and rear portion 24" of interlocking lever 24 for the iris-limiting lever 24, which is pivoted by shaft 25 on the outside of shutter casing 20.

The lens shutter according to the present invention is a shutter of the type wherein super-high shutter velocity, such as 1/1000 second or 1/2000 second, etc. is obtainable. In the drawings which illustrate embodiments of this invention by way of example, the iris-limiting interlocking lever 24 may alter its iris value freely independently of the lug 26 in a range of shutter velocity below 1/500 second.

In the usual practice of regulating the shutter time at the highest velocity of 1/500 second, the head portion 24' of interlocking lever 24 is engagingly in contact with engaging protrusion 28, while the rear portion 24" of lever 24 comes in contact with the lug 26 at the maximum iris-value f2.8. Thus, in this instance, the iris-operation ring 33 can alter the iris value freely from the maximum iris value of f2.8 to the minimum iris value of f22. Now, if for instance the exposure time is adjusted at 1/2000 sec. by revolving the exposure time governing ring 2 anticlockwise, in order to obtain a super-high shutter velocity, then engaging lug 28 will push on the head portion 24' of interlocking lever 24 to the right as viewed in FIG. 11 by the revolution of said actuating ring 2, while the other lug 26, being pushed forward by rear portion 24", and also the iris-guide ring 42 being also correspondingly rotated, and the indication mark 23 (FIGS. 16 and 17) then points at the iris aperture, i.e. f8 for this particular case, corresponding to the aperture of exposure blades in the case of velocity 1/2000 second.

In other words, when a super-high velocity of 1/2000 sec. is used, the iris value can freely be set at or lower than f8. If it is intended to choose values above f8, such movement of the ring 42 will be prevented by the rear portion 24" of interlocking lever 24.

Similarly, if the velocity indication mark 17 is adjusted at 1/1000 sec. on the velocity scale 18, the lug 28 may select iris-values freely by the guide lever 27 at the minimum iris value to f4, but never exceeding f4, for restricting the lug 26 at the position where the iris-mark 23 points towards f4 through interlocking lever 24.

Figure 14:
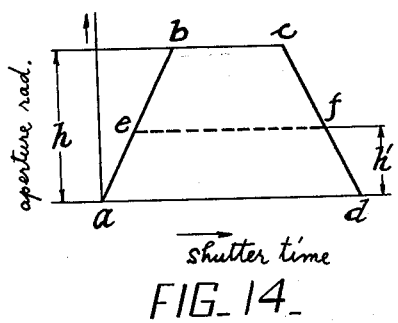
FIGS. 14 and 15 are graphs showing the relationship of shutter time versus iris aperture according to this invention.
Figure 15:
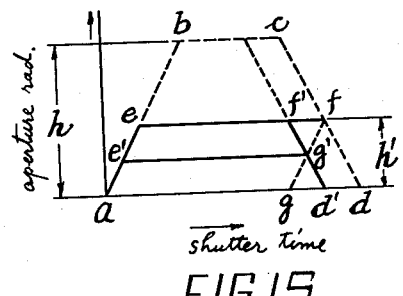

FIGS. 14 and 15 are graphs showing the relationship between the shutter time and shutter blades aperture in the present invention. In FIG. 14 is an illustration of a graph for the ordinary lens shutter. Similarly, FIG. 15 is an illustration showing the graph for the case where the present invention has been applied in order to effect the exposure action with high fidelity. FIGS. 16 and 17 are plan views of essential parts of the high fidelity shutter mechanism in respective embodiment forms with a part thereof being taken off. FIG. 18 is an illustrative development of FIG. 10, FIGS. 16 and 17.

In usual lens shutters, the efficiency of shutter operation is low, which tendency is especially remarkable in high speed operations. Up to an exposure of 1/500 sec. it is a well-known fact that the efficiency becomes around 60% when the iris blades are in full open position. This will now be explained in reference to the drawings. FIG. 14, the shutter time is taken along the abscissa and the aperture of shutter blades is shown along the ordinate. The maximum aperture is set as $h$, with which aperture is supposed to conduct a shutter of 1/500 sec. In this case, it is presumed that the efficiency $\tau = 60\%$.

Total exposure time: $t_1 = \overline{ad}$; the full open time: $t_2 = \overline{bc}$.
Effective exposure time $T = (t_1 + t_2)/2$.

$$\tau = T/t_1 \times 100 \text{ (percent)}$$

where $\tau = 60\%$; $T = 2$ ms. ($= 1/500$ sec.), then $t_1 = 2/0.6$ ms. $= 3.33$ ms., $t_2 = 0.67$ ms.

Now, suppose an instance of the effective aperture of $h$ under the full open iris-condition to be, for instance, f2.8. Considering the case when it is considered in f5.6, the aperture radius $h'$ is: $h' = h/2$ $$t_1' = \overline{ad} = 3.33 = t_1$$
$$t_2' = \overline{ef} = 2 \text{ ms.}$$

(Graph $abcd$ is assumed to be a trapezoid).

$$T' = (t_1' + t_2')/2 = (3.33 + 2)/2 \cdot \text{ms.}$$
$$= 2.66 \text{ ms.}$$

That, which has to be 2 ms., would become 2.66 ms., which is larger by 0.66 ms.; the operation, which has to be a shutter velocity of 1/500 sec., would then become lower than 1/400 sec. in reality. Thus, the change of exposure time due to the iris value would be the more remarkable, the smaller the iris-aperture. When the minimum iris value is used, the effective exposure time will substantially equal the total exposure time. In this instance, a shutter velocity of approximately 333 ms., i.e. 1/300 sec. as usually designated, which decreases to 1/300 sec. in reality.

The above-mentioned phenomenon is an absolutely inevitable fact for the high shutter velocity (including low velocity of approximately 3.33 ms., i.e. 1/300 sec. as usually ciprocating lens shutters, which is one of the great disadvantages of the lens shutter. In order to eliminate the above-mentioned disadvantage, it is sufficient to satisfy with the condition:

$$\frac{ad+bc}{2} = \frac{ad'+ef'}{2} = T$$

by altering the motion of shutter blades at a decreased iris value, as shown in FIG. 15. Namely in this case, first draw the lines, $dgef$ and draw a parallel line $d'g'f'$ parallel to the line $df$. From the middle point $g'$ of $gf$-line parallel to $df$ line, then $T'$, effective exposure time at the aperture $h'$, is as below:

$$T' = \frac{\overline{ad'} + \overline{ef'}}{2} = ef = T \ldots \quad (1)$$

which equals the aperture radius $h$.

It has been described before that the total shutter time can be made shorter by effecting the exposure operation, after setting the mutual overlapping of the rear portion 13' of exposure blades so as to make larger in the still and closed condition by altering the relative position of revolving shaft 16 of exposure blades 13 with driving pin 14. Similar alterations being applied to the iris operation, in FIG. 15 the total time of exposure, $ad$, is shortened by $d'd$ and made to be $ad'$, thereby satisfying the above-mentioned Formula 1 to be satisfied. Therefore, it is quite evident that the change of exposure time due to the variation of iris aperture can be prevented.

As represented by FIG. 18, the high fidelity shutter mechanism is provided with a well-known construction, i.e. a revolving ring 5 for exposure blades, a suitable number of idle holes 38 for shutter blade actuating pins, idle holes 39 for same revolving shaft and a suitable number of holes 40 for shutter blade stopping pins, which are formed in said iris stopping ring 35, said shutter blade stopping ring 35 being secured by set screw 41 in shutter case 20 (is not illustrated in FIG. 18), shutter blades 13 being arranged having stop pins 34 and actuating pins 32 (FIG. 9) as well as iris operating ring 33 being formed with shutter blade operating grooves 37 and blade guide ring 42 being projectingly provided with guide lever 27, the front end of which is folded to form a pointer 23, which in turn is made to be positioned to register with the scale 22. In such a type of shutter member, a cam 43 for high fidelity control is formed in guide ring 42, and simultaneously the rear bifurcated portion 45 of lever 44 being pivoted to a part inside of shutter casing 20 (not illustrated in FIG. 18) by means of shaft 48 being brought to engage with pin 49 planted on revolving ring 5, thereby causes the interlocking pin 47 planted on top 19 of said lever 44 to contactingly engage with cam 43 for governing.

Thus, as explained in FIG. 15, the object of this invention is to ensure, by altering the relative position of the revolving shaft 16 of shutter blades 13 with actuating pin 14 thereof according to the change of iris values, that the effective shutter time may be equal to the full open aperture of shutter blades, namely in said drawing, the effective shutter time:

$$\frac{ad'+ef'}{2}$$

for the case with iris aperture being reduced to small size, always equivalent to the effective shutter time:

$$\frac{ad+bc}{2}$$

for the case with iris aperture being opened.

The manner of the practical operation will now be described with reference to FIGS. 16, 17 and 18.

In the case of full open $f2.8$, as illustrated in FIG. 16, the governing cam 43 for induction ring 42 secured to actuating ring 33 by means of set screw 36 is engaged with interlocking rod 47 of lever 44. The exposure blades 13 are in the standard closed position with respect to aperture 30. However, when the iris aperture is made smaller by operating the guide lever 27 clockwise in FIG. 18 as by a well-known process, then the interlocking pin 47 will be guided to deflect toward the center of the shutter by means of controlling cam 43. Therefore, lever 44 revolves around shaft 48 anticlockwise. Revolving ring 5 thereupon revolves clockwise through pin 49, and the shutter blades 13 on the contrary turn clockwise about driving pin 14 as a fulcrum. As shown in FIG. 17, the rear portion 13' of the shutter blades increases overlapping thereof. If on this condition the operation of exposure is performed, the shutter time will be shortened by an extent of the alteration of the overlapping of said rear portion 13', as referred to above.

Further, it is evident from FIGS. 16 and 17 that the state of exposure blades 13 is remarkably distinguished from one another. Namely, the revolving ring 5 displaces continuously at each graduation of the scale from $f2.8$, the full open, to $f22$, the minimum aperture of iris by the actuation of controlling cam 43, thus the starting position for each iris value being controlled. Consequently, a lens shutter can easily be provided which is of high fidelity with respect to numerals shown upon the apparatus and indicated by a pointer for the reason that, at every decrease in iris aperture by virtue of appropriate design of controlling cam 43, the relative position of the revolving shafts 16 of shutter blades 13 and actuating pin 14 is altered to vary the overlapping of blades thus compensating for the remarkable lowering of the shutter velocity from the indicated velocity when the iris aperture is decreased. This latter is one of the disadvantages of the usual lens shutters.

Figure 19:
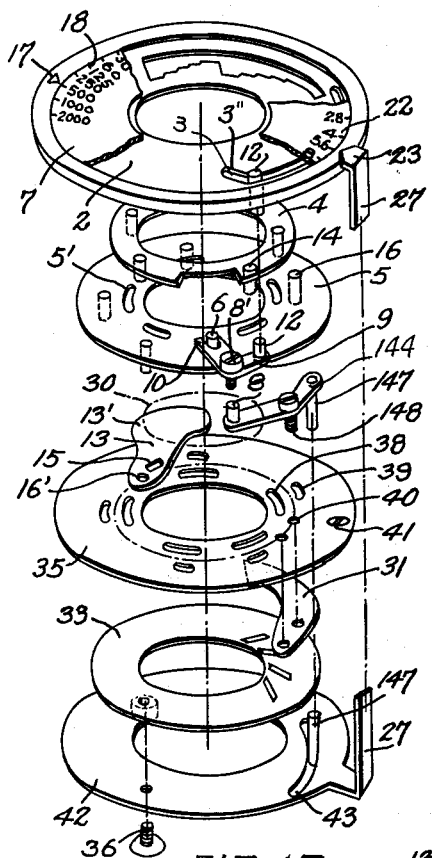
FIG. 19 is a development illustration of the case wherein the devices in FIG 9 and FIG. 17 are used in combination.
Figure 20:
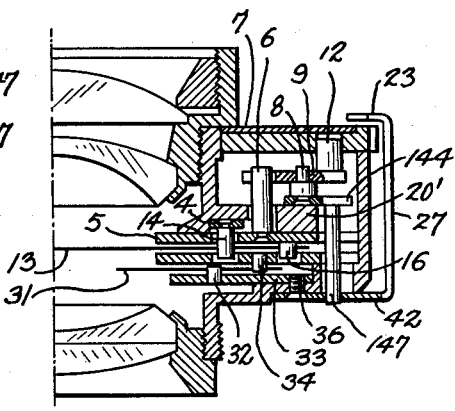
FIGS. 20 and 21 are longitudinal sectional side views similar to FIG. 9, wherein the parts shown in development illustration of FIG. 19 are assembled mechanically.
Figure 21:
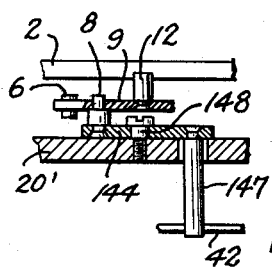

FIG. 19 is an illustration of an embodiment contemplating to provide a device of a more exact and higher fidelity by combining the device of FIGS. 16, 17 and 18 with the said super-high velocity exposure device illustrated in FIGS. 8 to 13. FIG. 19 shows merely the essential portions of this embodiment. FIGS. 20 and 21 are views similar to FIG. 9, wherein the special features of FIG. 19 are assembled mechanically.

The above-mentioned drawing illustrates the exposure time governing ring 2, exposure blade driving ring 4, revolving ring 5, iris stopping ring 35, iris operating ring 33, iris induction ring 42, etc. A pin 6 of the revolving ring 5 is brought to engage with bifurcated rear portion 10 of lever 9, to which is secured the interlocking rod 12 which engages with the regulating cam 3 for governing ring 2, as shown in FIGS. 20 and 21 like FIG. 10. The lever 9 is formed with an axial hole 8' which is pivoted with a shaft 8 fixed on one end of lever 144 which in turn is pivoted to shutter casing 20 (not illustrated) by a shaft 148 to constitute a super-high velocity snutter device. Further, in the above-mentioned device, like the shutter mechanism as shown in FIG. 18, an interlocking pin 147 provided at the other end of lever 144 engages with controlling cam 43 of guiding ring 42 to constitute a high fidelity shutter device.

When the iris value is changed by operating the guide lever 27, the interlocking pin 147 will be actuated by controlling cam 43, and lever 144 revolving about shaft 148 acts to move lever 9 through shaft 8 and axial hole 8'. In this case, lever 9 is moved around interlocking pin 12 by shaft 8. As a result, the revolving ring 5 is turned somewhat through pin 6, to alter the relative position of revolving shaft 16 and controlling pin 14, the shutter blades 13 being deflected to alter the overlapping of rear portion 13'. In this case the manner of operation is similar to the case illustrated in FIG. 18.

Thus, when the super-high shutter velocity is desirable, the indicator 17 is adjusted, for instance, at 1/2000 sec. of the required velocity scale, then the interlocking pin 12 will be deflected inwardly, and simultaneously lever 9 will be turned anticlockwise around shaft 8 engaging with axial hole 8'. Therefore, the revolving ring 5 turns then clockwise through pin 6, and revolving shaft 16 causes the shutter blades 13 to deflect, and with a result the mutual overlapping of its rear portion 13' will be larger, to be ready for the super-high shutter velocity.

However, for instance, in said super-high shutter velocity of 1/2000 sec., wherein the iris aperture limiting interlocking means as shown in FIGS. 11, 12 and 13 is added, the iris value will automatically be limited to f8 as has been described.

Figure 22:
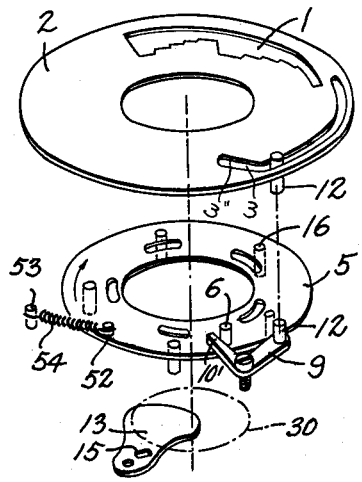
FIG. 22 represents improved essential parts shown in FIG. 10.

In the operation of the device according to the present invention, it would be feared that if there are larger clearances between the controlling cam 3 and interlocking pin 12 and between the bifurcated end 10 of lever 9 and the pin 6 of revolving ring 5, the actuation of exposure blades 13 will be likely to become unstable due to both above-mentioned clearances. Therefore, as shown in the view of improved essential parts of FIG. 10 in FIG. 22, pin 52 is fixed on revolving ring 5, and a coil spring 54 is arranged hangingly between said pin 52 and pin 53 fixed on shutter casing 20 (not illustrated), said rotating ring 5 being always pulled to the direction of an arrow. By this arrangement, pin 6 comes in contact with one end 10' of lever 9. Consequently, as an interlocking pin 12 comes always in contact with a working flange 3" of the cam 3, the exposure operation is necessarily performed under predetermined conditions. Moreover, since levers and regulating cams having only working flanges as shown by way of example they can be used without necessitating strict register with the width of regulating cam 3 and diameter of interlocking pin 12 with the dimensions of pin 6 and bifurcated end portion 10, which is advantageous also from the point of fabrication. Further, by using a similar method, it is of course possible to stabilize the shutter operation in the case with a high fidelity shutter.

In the lens shutter according to the present invention, as described above, although the construction is simple and easy to work, a super-high shutter velocity of 1/2000 second can be made, and the lowering of shutter velocity occurring when the iris-value is reduced can be perfectly avoided, thus the exposure time is exactly maintained as indicated.

I claim:

1. A photographic camera lens shutter comprising a plurality of shutter blades for opening and closing an aperture, each of said blades having an actuating slot therein, revolving shafts upon which said respective blades are mounted, a revolving ring in which each of said revolving shafts is fixed, an actuating pin extending into the slot in each blade, an actuating ring in which each of said actuating pins is fixed, said revolving ring being rotatable to drive said blades about said actuating pins to pre-set the overlap of said blades to determine the speed of opening and closing the aperture, and means for rotating said actuating ring to reciprocate said blades.

2. A photographic camera lens shutter according to claim 1, wherein means are provided for pre-setting the overlap of said blades for super-high shutter velocity comprising a super-high velocity regulating cam on the controlling ring of the shutter, an interlocking pin engaging said regulating cam, a lever fixed to said interlocking pin adjacent said revolving ring and pivoted externally thereto, and a connection between said lever and said revolving ring, whereby said lever rotates said ring responsive to contact between said interlocking pin and said regulating cam.

3. A photographic camera lens shutter according to claim 2 wherein said super-high velocity regulating cam is separate from the standard regulating cam on the controlling ring of the shutter.

4. A photographic camera lens shutter comprising a plurality of shutter blades pivotally mounted to open and close an aperture, means for reciprocating said blades, and means for pre-setting the overlap of said blades to determine the speed of opening and closing the aperture, said pre-setting means comprising a revolving ring upon which said blades are pivoted, an actuating ring, actuating pins fixed in said actuating ring engaging said blades, an intermediately pivoted lever having a pivotal connection at one end with said revolving ring, an interlocking pin carried by the other end of said lever, and a rotatable cam engaging said interlocking pin to turn said lever, said revolving ring and said shutter blades, in combination with an iris aperture limiting member for super-high shutter velocity, and a lever pivoted to the shutter casing engaging said means for reciprocating said blades and said iris aperture limiting member, whereby said means for reciprocating said blades prevents said iris aperture limiting member from setting the iris opening beyond the specific aperture corresponding to the desired super-high shutter velocity and said iris aperture limiting member prevents said means for reciprocating said blades from setting the shutter speed beyond that corresponding to the desired iris aperture opening.

5. A photographic camera lens shutter comprising a plurality of shutter blades, means for reciprocating said blades to open and close an aperture, an actuating slot in each of said shutter blades, a revolving ring upon which said blades are pivoted, an actuating ring, actuating pins fixed in said actuating ring engaging said blades in said actuating slots, an intermediately pivoted lever having one end thereof pivotally connected with said revolving ring, an interlocking pin carried by the other end of said lever, and a rotatable cam engaging said interlocking pin to turn said lever and said revolving ring thereby pivoting said shutter blades in a manner whereby the overlap of said blades is preset to determine the speed of opening and closing said aperture.

6. A photographic camera lens shutter comprising a plurality of shutter blades pivotally mounted to open and close an aperture, each of said shutter blades having an actuating slot therein, an actuating ring, a plurality of actuating pins, each of said pins fixed to said acuating ring and extending into an actuating slot to engage a shutter blade, a revolving ring upon which each of said shutter blades is pivoted, an intermediately pivoted lever having one end thereof pivotally connected with said revolving ring, an interlocking pin carried by said pivoted lever, and a rotatable cam engaging said interlocking pin to turn said lever, said rotatable cam being operable through said pivoted lever to effect rotation of said revolving ring to thereby pivot said shutter blades about said actuating pin in a manner whereby the overlap of said blades may be preset to determine the speed of opening and closing said aperture.

7. In a photographic camera lens shutter according to claim 5, wherein a guide ring is disposed adjacent said actuating ring, and said guide ring includes a high fidelity controlling cam.

References Cited in the file of this patent

UNITED STATES PATENTS

| | | |
|---|---|---|
| 2,663,235 | Fuerst | Dec. 22, 1953 |
| 2,718,835 | Fuerst | Sept. 27, 1955 |
| 2,803,181 | Willcox | Aug. 20, 1957 |
| 2,849,937 | Burger | Sept. 2, 1958 |
| 2,900,886 | Gebele | Aug. 25, 1959 |
| 2,926,586 | Gebele | Mar. 1, 1960 |